United States Patent
West et al.

(10) Patent No.: US 11,628,695 B2
(45) Date of Patent: Apr. 18, 2023

(54) TIRE SENSOR CONTAINER SYSTEM FOR IMPROVED SENSOR FUNCTIONALITY AND LONGEVITY

(71) Applicant: The Goodyear Tire & Rubber Company, Akron, OH (US)

(72) Inventors: Jeffrey McKay West, Uniontown, OH (US); Arun Kumar Byatarayanapura Gopala, Copley, OH (US); Michael William Kestner, Canton, OH (US); Junling Zhao, Hudson, OH (US); Peter Jung-min Suh, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 17/502,078

(22) Filed: Oct. 15, 2021

(65) Prior Publication Data
US 2022/0185043 A1 Jun. 16, 2022

Related U.S. Application Data

(60) Provisional application No. 63/125,455, filed on Dec. 15, 2020.

(51) Int. Cl.
*G01L 17/00* (2006.01)
*B60C 23/04* (2006.01)
*G01L 19/00* (2006.01)

(52) U.S. Cl.
CPC .......... *B60C 23/0493* (2013.01); *G01L 17/00* (2013.01); *G01L 19/0092* (2013.01)

(58) Field of Classification Search
None
See application file for complete search history.

(56) References Cited

U.S. PATENT DOCUMENTS

| | | | |
|---|---|---|---|
| 6,443,198 B1 | 9/2002 | Koch et al. | |
| 6,444,069 B1 * | 9/2002 | Koch | B60C 19/00 |
| | | | 156/123 |

(Continued)

FOREIGN PATENT DOCUMENTS

| | | |
|---|---|---|
| DE | 19745734 A1 | 4/1999 |
| DE | 20216290 U1 | 1/2003 |

(Continued)

OTHER PUBLICATIONS

Search Report for corresponding European Application received by Applicant dated May 19, 2022.

*Primary Examiner* — Lisa M Caputo
*Assistant Examiner* — Nigel H Plumb
(74) *Attorney, Agent, or Firm* — Edward T. Kennedy

(57) ABSTRACT

A tire sensor container system is provided. A tire includes a carcass toroidally extending from a first bead area to a second bead area, and an innerliner formed on an inner surface of the carcass. The tire sensor container system includes a tire pressure monitoring system sensor, which in turn includes a rigid housing that is formed with an oval shape. A flexible container is mounted to the innerliner. The container includes a base and a wall extending radially outwardly from the base, and the wall terminates in a lip. The container wall is formed with an oval shape that cooperates with the shape of the tire pressure monitoring sensor housing. A cavity is defined by the base, the wall, and the lip, and cavity receives and secures the tire pressure monitoring system sensor. The system reduces sensor rotation and maintains consistent sensor orientation to improve sensor functionality and longevity.

15 Claims, 5 Drawing Sheets

(56) References Cited

U.S. PATENT DOCUMENTS

| | | | |
|---|---|---|---|
| 6,546,982 B1* | 4/2003 | Brown | B60C 23/0433 |
| | | | 29/601 |
| 6,885,291 B1* | 4/2005 | Pollack | B60C 23/0493 |
| | | | 340/447 |
| 6,889,153 B2 | 5/2005 | Dietiker | |
| 7,280,036 B2* | 10/2007 | Kafrawy | B60C 11/243 |
| | | | 340/442 |
| 8,596,117 B2 | 12/2013 | Wilson et al. | |
| 9,016,118 B2* | 4/2015 | Townsend | B60C 23/0493 |
| | | | 73/866.5 |
| 9,283,817 B2* | 3/2016 | Sandstrom | B60C 11/04 |
| 9,352,615 B2* | 5/2016 | Djelloul-Mazouz | |
| | | | B60C 1/0016 |
| 9,649,889 B2* | 5/2017 | Engel | G01S 1/022 |
| 2019/0184773 A1* | 6/2019 | Saito | B60W 40/06 |

FOREIGN PATENT DOCUMENTS

| | | |
|---|---|---|
| DE | 102007001279 | 7/2008 |
| DE | 102010000003 A1 | 7/2011 |
| JP | 2005-028950 A | 2/2005 |
| KR | 102124829 B1 | 6/2020 |

\* cited by examiner

TIRE SENSOR CONTAINER SYSTEM FOR IMPROVED SENSOR FUNCTIONALITY AND LONGEVITY

FIELD OF THE INVENTION

The invention relates to vehicle tires. More particularly, the invention relates to vehicle tires with sensors that determine various conditions within the tires. Specifically, the invention is directed to a sensor container system for a tire, which includes a sensor and container structure that maintains a consistent sensor orientation with respect to an innerliner of the tire.

BACKGROUND OF THE INVENTION

In the manufacture of a pneumatic tire, the tire is typically built on the drum of a tire-building machine, which is known in the art as a tire building drum. Numerous tire components are wrapped about and/or applied to the drum in sequence, forming a cylindrical-shaped tire carcass. The tire carcass is then expanded into a toroidal shape for receipt of the remaining components of the tire, such as a belt package and a rubber tread. The completed toroidally-shaped unvulcanized tire carcass, which is known in the art at that stage as a green tire, is then inserted into a mold or press for forming of the tread pattern and curing or vulcanization.

Some tires include a sensor for a tire pressure monitoring system (TPMS), which enables the pressure inside the tire to be monitored. A TPMS sensor typically includes an antenna for wirelessly transmitted measured data to a receiver unit for processing and/or storage. In the prior art, TPMS sensors have been directly mounted to an innerliner of the tire through direct attachment using an adhesive. However, such direct attachment made replacement of the TPMS sensor difficult. As a result, some TPMS sensors have been mounted to the innerliner using a flexible housing or container, which enables replacement of the TPMS sensor, while withstanding the dynamic environment of the tire.

To ensure optimum operation of the TPMS sensor, correct placement and orientation of the sensor on the innerliner is important. Due to the dynamic nature and harsh operating environment of the tire, many replaceable prior art TPMS sensors were subject to rotation with respect to the innerliner. Such rotation disturbed the orientation of the TPMS sensor, and in some cases, reduced the useful life of the sensor.

In addition, it is sometimes desirable to employ further sensors, such as tread wear sensors, temperature sensors, accelerometers, load sensors, and the like, in the tire. When these additional sensors are employed, the use of one source of data transmission from the tire is efficient, which may be the antenna of the TPMS sensor. As a result, an electrical connection between other sensors and the TPMS sensor needs to be established and maintained. As mentioned above, the nature of the operating environment of the tire may cause a replaceable TPMS sensor to rotate with respect to the innerliner, which may undesirably disturb the electrical connection between the TPMS sensor and other sensors.

As a result, there is a need for a tire sensor container system that reduces rotation of a replaceable TPMS sensor with respect to the tire innerliner and maintains a consistent orientation of the sensor to improve the functionality and longevity of the sensor.

SUMMARY OF THE INVENTION

According to an aspect of an exemplary embodiment of the invention, a tire sensor container system is provided. The tire includes a carcass toroidally extending from a first bead area to a second bead area, and an innerliner being formed on an inner surface of the carcass. The tire sensor container system includes a tire pressure monitoring system sensor that includes a rigid housing formed with an oval shape. A flexible container is mounted to the innerliner. The container includes a base and a wall extending radially outwardly from the base, and the wall terminates in a lip. The container wall is formed with an oval shape that cooperates with the shape of the tire pressure monitoring sensor housing. A cavity is defined by the base, the wall, and the lip, and the cavity receives and secures the tire pressure monitoring system sensor.

Definitions

"Axial" and "axially" mean lines or directions that are parallel to the axis of rotation of the tire.

"Axially inward" and "axially inwardly" refer to an axial direction that is toward the axial center of the tire.

"Axially outward" and "axially outwardly" refer to an axial direction that is away from the axial center of the tire.

"Bead" means that part of the tire comprising an annular tensile member wrapped by ply cords and shaped, with or without other reinforcement elements such as flippers, chippers, apexes, toe guards and chafers, to fit the design rim.

"CAN bus" is an abbreviation for controller area network.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Equatorial plane (EP)" means the plane perpendicular to the tire's axis of rotation and passing through the center of its tread.

"Footprint" means the contact patch or area of contact created by the tire tread with a flat surface, such as the ground, as the tire rotates or rolls.

"Inboard side" means the side of the tire nearest the vehicle when the tire is mounted on a wheel and the wheel is mounted on the vehicle.

"Innerliner" means the layer or layers of elastomer or other material that form the inside surface of a tubeless tire and that contain the inflating fluid within the tire.

"Lateral" means an axial direction.

"Lateral edges" means a line tangent to the axially outermost tread contact patch or footprint as measured under normal load and tire inflation, the lines being parallel to the equatorial centerplane.

"Outboard side" means the side of the tire farthest away from the vehicle when the tire is mounted on a wheel and the wheel is mounted on the vehicle.

"Radial" and "radially" mean lines or directions that are perpendicular to the axis of rotation of the tire.

"Radially inward" and "radially inwardly" refer to a radial direction that is toward the central axis of rotation of the tire.

"Radially outward" and "radially outwardly" refer to a radial direction that is away from the central axis of rotation of the tire.

"TPMS" means a tire pressure monitoring system, which is an electronic system that measures the internal pressure of a tire and is capable of communicating the pressure to a processor that is mounted on the vehicle and/or is in electronic communication with electronic systems of the vehicle.

"Tread element" or "traction element" means a rib or a block element defined by a shape having adjacent grooves.

BRIEF DESCRIPTION OF DRAWINGS

The invention will be described by way of example and with reference to the accompanying drawings, in which.

Similar numerals refer to similar parts throughout the drawings.

DETAILED DESCRIPTION OF THE INVENTION

Figure 1:
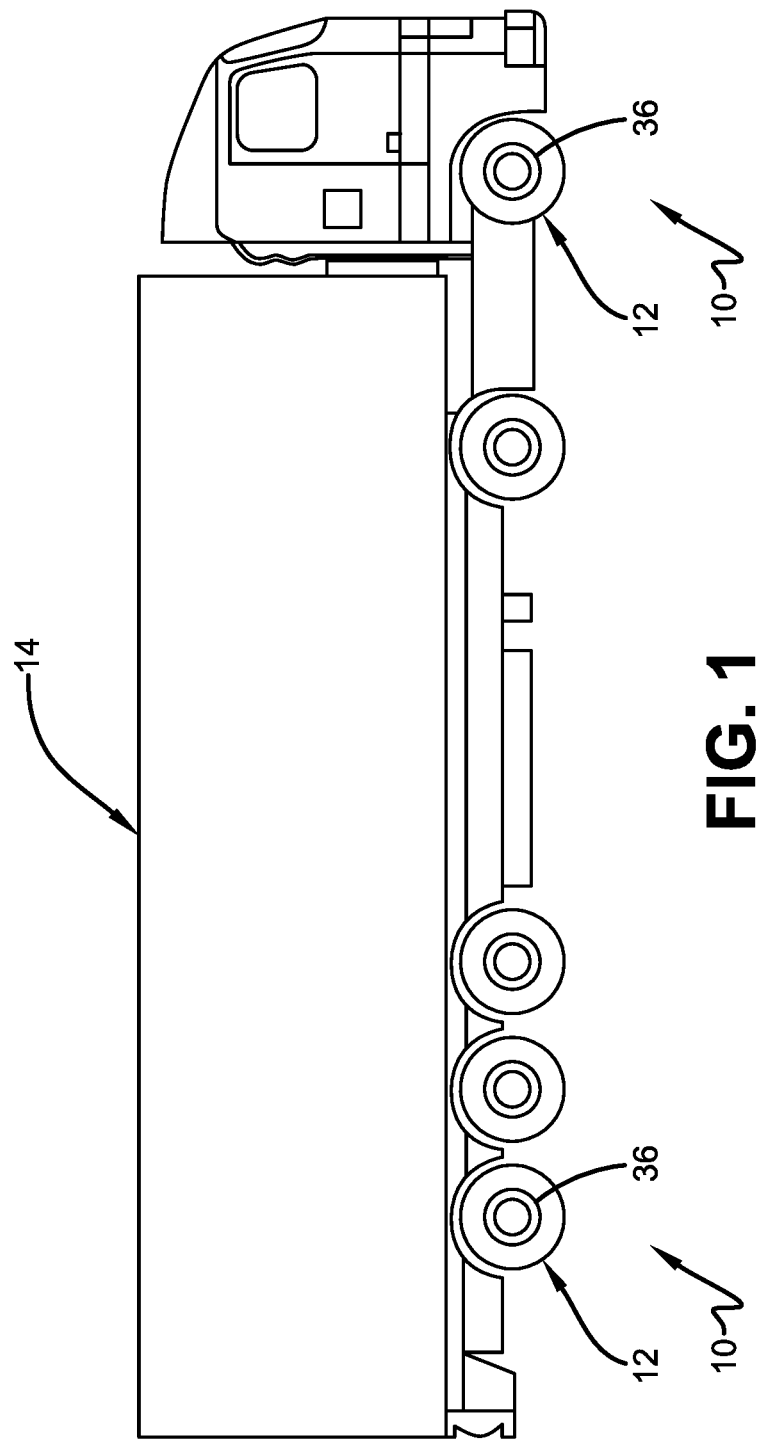
FIG. 1 is a schematic side view of a vehicle with tires that include an exemplary embodiment of the tire sensor container system of the present invention.

An exemplary embodiment of the tire sensor container system of the present invention is indicated at 10 in FIGS. 1 through 8. With particular reference to FIG. 1, one or more tires 12 supports a vehicle 14. While the vehicle 14 is depicted as a commercial truck, the invention is not to be so restricted. The principles of the invention find application in other vehicle categories, such as passenger vehicles, off-the-road vehicles and the like, in which vehicles may be supported by more or fewer tires than shown in FIG. 1.

Figure 2:
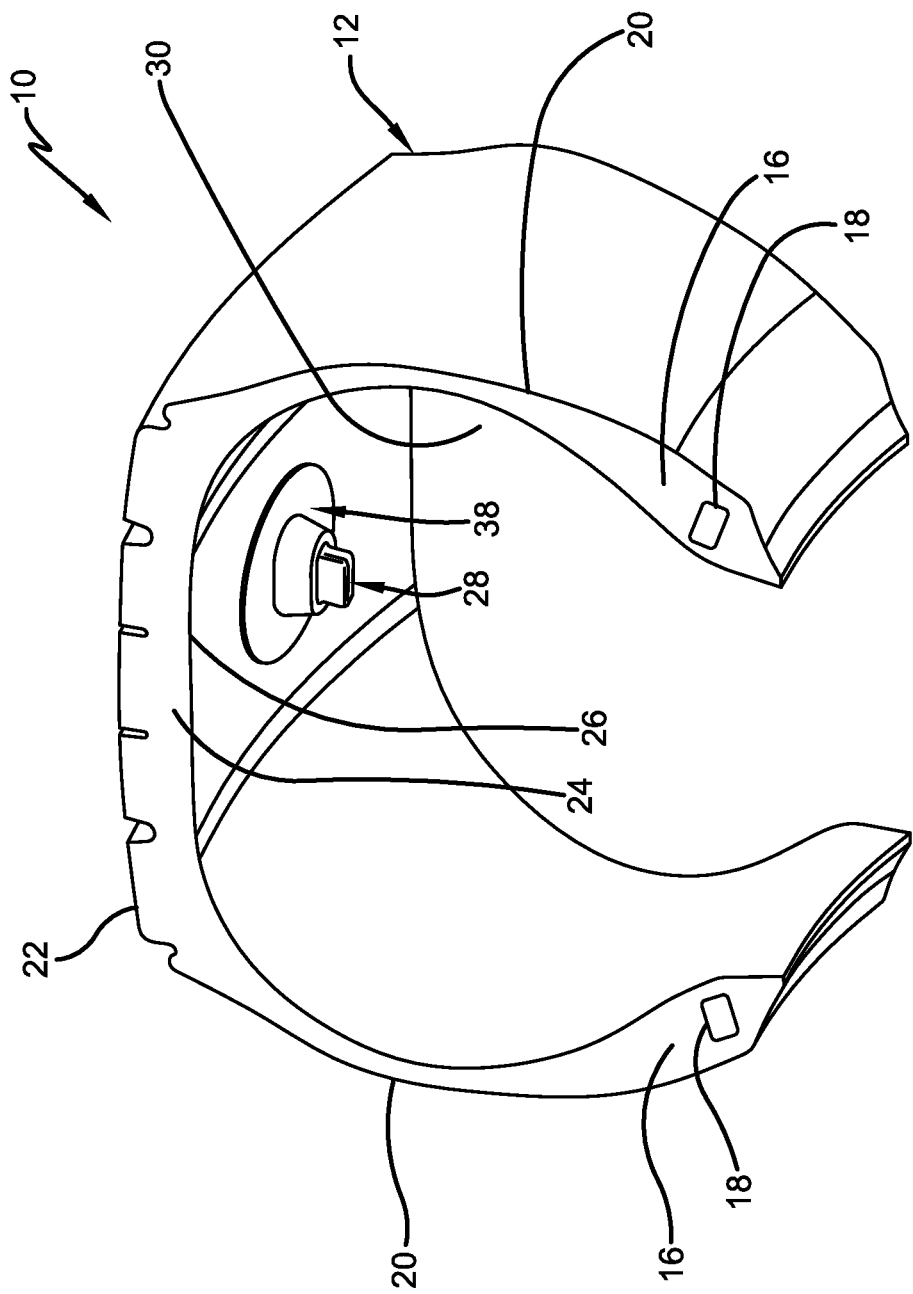
FIG. 2 is a perspective cross-sectional view of a portion of a tire shown in FIG. 1.

Turning to FIG. 2, the tire 12 includes a pair of bead areas 16, each one of which is formed with a bead core 18 that is embedded in the respective bead areas. Each one of a pair of sidewalls 20 extends radially outwardly from a respective bead area 16 to a ground-contacting tread 22. The tire 12 is reinforced by a carcass 24 that toroidally extends from one bead area 16 to the other bead area, as known to those skilled in the art. An innerliner 26 is formed on the inner or inside surface of the carcass 24. The tire 12 is mounted on the flange of a wheel or rim 36 (FIG. 1) as known in the art, forming an internal cavity 30.

A sensor unit 28 is mounted to the tire 12. The sensor unit 28 detects certain real-time parameters of the tire 12, and preferably includes a pressure sensor to sense the inflation pressure within a cavity 30 of the tire, and a temperature sensor to sense the temperature of the tire and/or the temperature in the cavity. The sensor unit 28 preferably is a commercially-available tire pressure monitoring system (TPMS) module or sensing unit, and shall be referred to herein for the purpose of convenience as a TPMS sensor.

The TPMS sensor 28 preferably also includes a processor and memory to store tire identification (ID) information for each specific tire 12. For example, the tire ID may include manufacturing information for the tire 12, including: the tire model; size information, such as rim size, width, and outer diameter; manufacturing location; manufacturing date; a treadcap code that includes or correlates to a compound identification; and a mold code that includes or correlates to a tread structure identification. The tire ID may also include a service history or other information to identify specific features and parameters of each tire 12.

Figure 3:
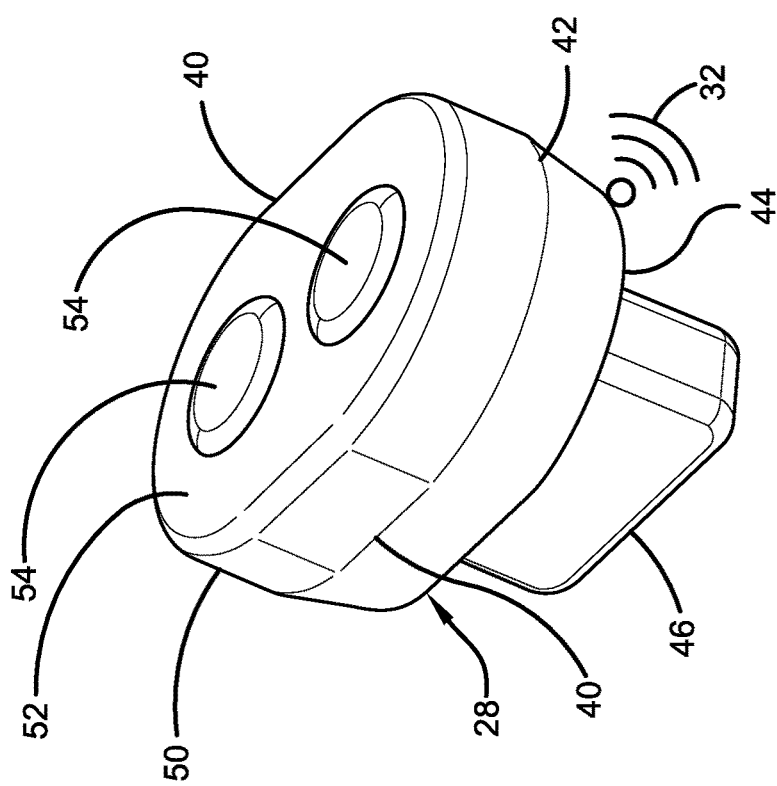
FIG. 3 is a perspective view of a TPMS sensor employed in the exemplary embodiment of the tire sensor container system of the present invention.
Figure 5:
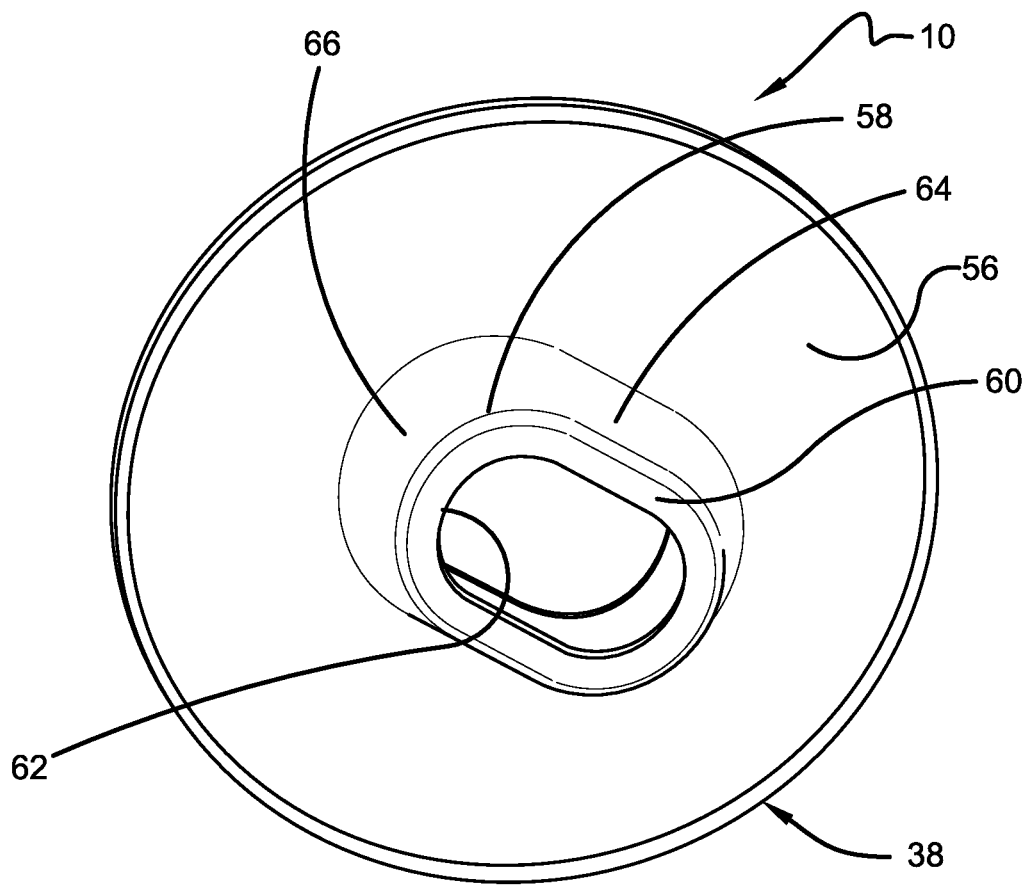
FIG. 5 is a first perspective view of a container portion of the tire sensor container system of the present invention.
Figure 6:
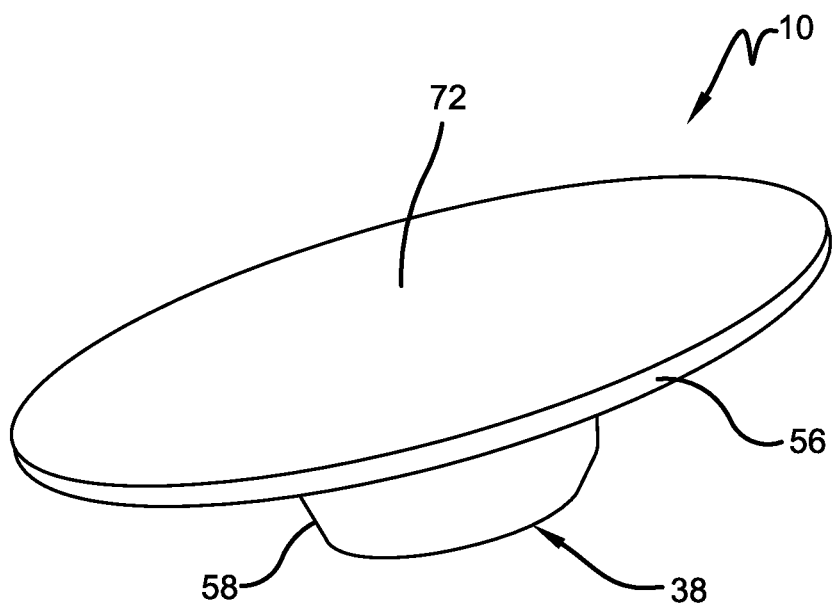
FIG. 6 is a second perspective view of the container portion shown in FIG. 5.
Figure 7:
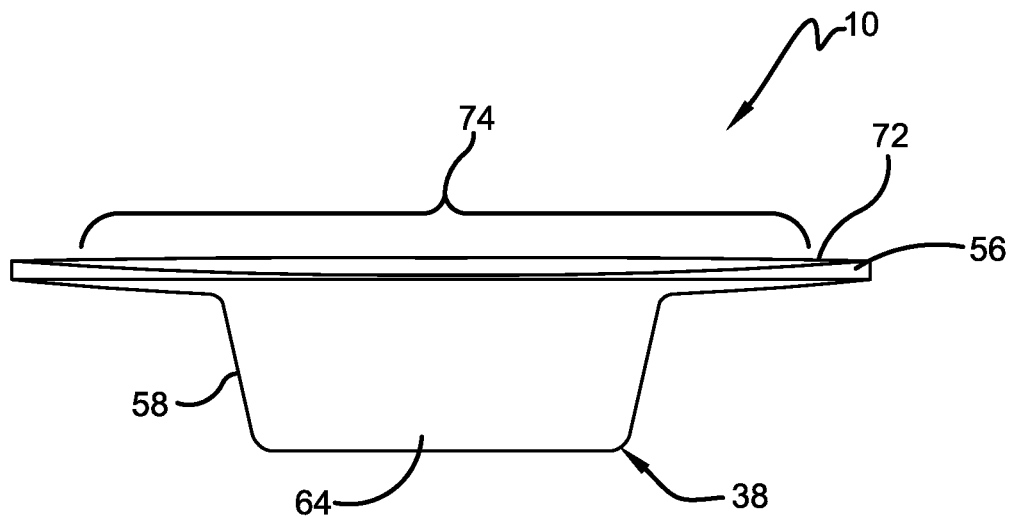
FIG. 7 is a side elevational view of the container portion shown in FIG. 5.
Figure 8:
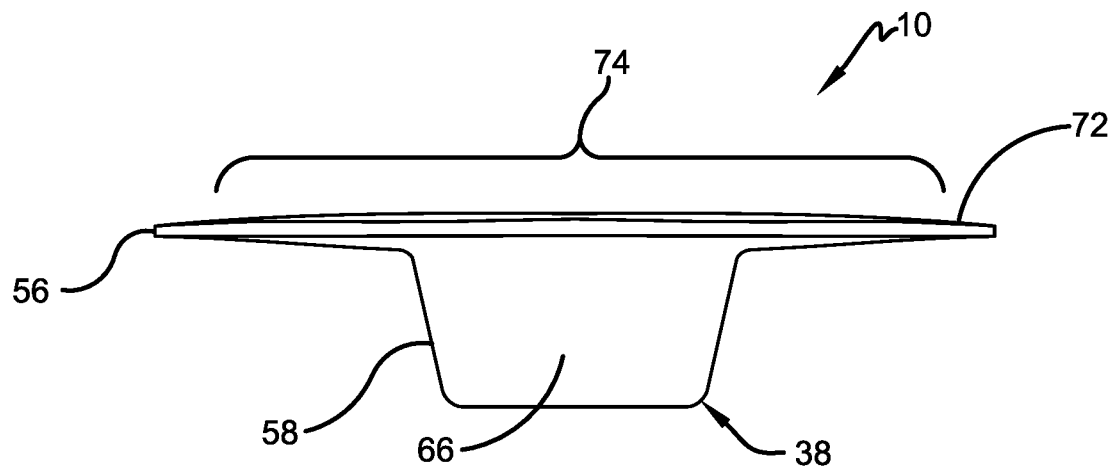
FIG. 8 is an end elevational view of the container portion shown in FIG. 5.

With additional reference to FIG. 3, the TPMS sensor 28 preferably further includes an antenna for wirelessly transmitting 32 measured parameters and tire ID data to a receiver or remote processor for analysis, such as a processor integrated into a vehicle electronic control unit and/or CAN bus. The TPMS sensor 28 includes a rigid housing 50 formed with a base 52. A pair of electrical contacts 54 are mounted on the base 52 and extend through the housing 50. The electrical contacts 54 enable the TPMS sensor 28 to electrically connect with other sensors 34 (FIG. 4), such as tread wear sensors, temperature sensors, accelerometers, load sensors, and the like.

The housing 50 of the TPMS sensor 28 is formed with an oval shape to prevent rotation of the sensor relative to the tire innerliner 26, as will be described in greater detail below. Thus, the housing 50 includes a pair of elongated sides 40 extending parallel to one another, and a pair of ends 42 that extend parallel to one another, and which are shorter than the sides 40. The housing 50 also includes a top 44 opposite the base 52, and a protrusion 46 extending radially from the top away from the housing. The protrusion 46 preferably is formed with a rectangular cross section, which enables the TPMS sensor 28 to be easily inserted into a container 38 (FIG. 2), removed from the container, and manually rotated in the container to a desired orientation with respect to the innerliner 26.

Figure 4:
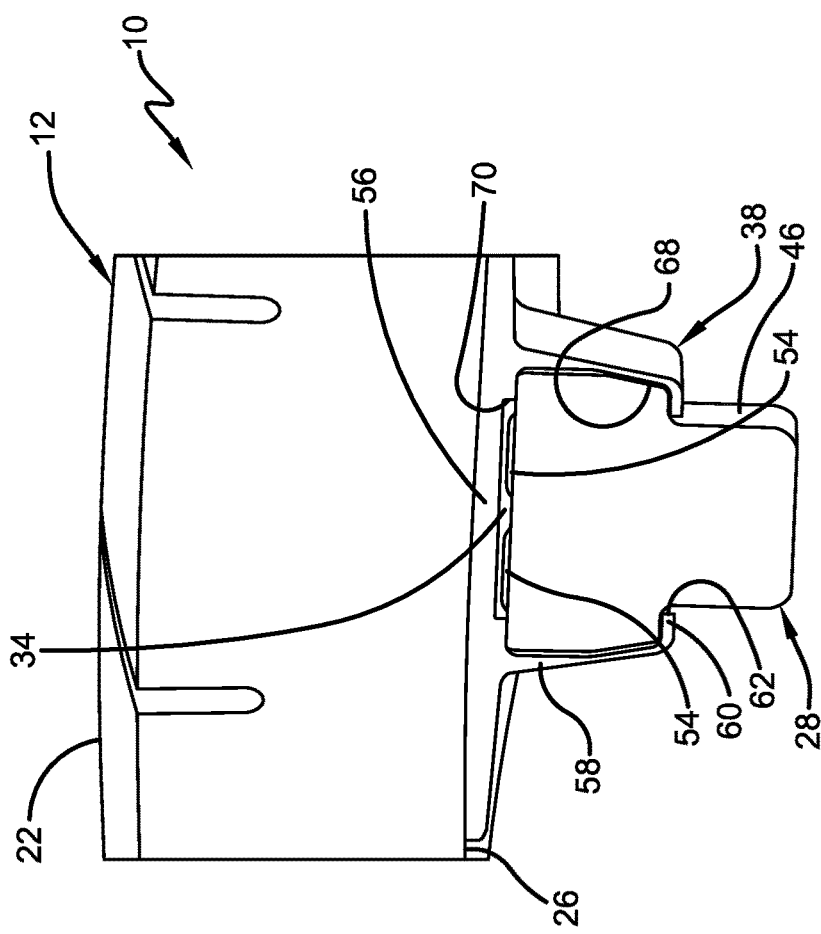
FIG. 4 is a schematic cross-sectional view of a portion of the tire shown in FIG. 2.

As shown in FIGS. 2 and 4, the TPMS sensor 28 is mounted to the tire 12 using a container 38, which enables the TPMS sensor to easily be removed and replaced when needed. With additional reference to FIGS. 5 through 8, the container 38 is flexible and preferably is formed of an elastomer or polymer. The container 38 includes a base 56 with a circular shape or an oval shape, and a wall 58 extending radially outwardly from the base. The wall 58 terminates in a lip 60, which defines an opening 62. The wall 58 is formed with an oval shape, and includes a pair of elongated sides 64 extending parallel to one another, and a pair of ends 66 extending parallel to one another, and are shorter than the sides 64. In this manner, the shape of the container wall 58 corresponds to and cooperates with the shape of the TPMS sensor housing 50.

The base 56, wall 58 and lip 60 cooperate to define a first cavity 68, which receives and secures the TPMS sensor 28. The TPMS sensor 28 is inserted into the first cavity 68 of the container 38 through the opening 62. Because the container 38 is formed of a flexible material, the wall 58 and lip 60 flex to allow insertion of the TPMS sensor 28 through the opening 62, and then secure the TPMS sensor in the first cavity 68. As mentioned above, the oval shape of the container wall 58 cooperates with the oval shape of the TPMS sensor housing 50. Because the oval-shaped sensor housing 50 securely seats in the first cavity 68, which is defined by the oval-shaped sensor wall 58, the orientation of the TPMS sensor 28 is secured and maintained, thereby minimizing rotation of the TPMS sensor relative to the innerliner 26 during vehicle operation.

With particular reference to FIG. 4, the wall 58 and base 56 of the container 38 preferably also form a second cavity 70, which is adjacent the first cavity 68. The second cavity 68 retains another sensor 34, such as such as a tread wear sensor, temperature sensor, accelerometer, load sensor, and the like. The flexible elastomer or polymer material of the container 38 ensures that the container retains both the TPMS sensor 28 and the additional sensor 34, and maintains electrical contact between the TPMS sensor and the additional sensor. The protrusion 46 on the TPMS sensor 28 enables the TPMS sensor to be manually adjusted or rotated in the first cavity 68 to ensure alignment of the electrical contacts 54 with the additional sensor 34.

Referring to FIGS. 4 and 6 through 8, the base 56 of the container 38 is formed with a bottom surface 72, which contacts and is secured to the innerliner 26. Preferably, the bottom surface 72 of the base 56 is attached to the innerliner 26 by an adhesive. In addition, the bottom surface 72 of the base 56 is formed with a double curvature 74 to improve contact with tire innerliner 26 and to maintain a compressive holding force on the TPMS sensor 28.

In this manner, the container 38 and the TPMS sensor 28 of the tire sensor container system 10 of the present invention are formed with complementary oval shapes, which cooperate to secure the position of the TPMS sensor, while enabling easy replacement of the TPMS sensor. The tire sensor container system 10 reduces rotation of the TPMS sensor 28 with respect to the tire innerliner 26, thereby maintaining a consistent orientation of the sensor to improve the functionality and longevity of the sensor. In addition, the tire sensor container system 10 maintains electrical contact between the TPMS sensor 28 and any additional sensors 34.

The present invention also includes a method of forming a tire sensor container system 10. The method includes steps in accordance with the description that is presented above and shown in FIGS. 1 through 8.

It is to be understood that the structure of the above-described tire sensor container system 10 may be altered or rearranged, or components or steps known to those skilled in the art omitted or added, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A tire sensor container system, wherein a tire includes a carcass toroidally extending from a first bead area to a second bead area and an innerliner being formed on an inner surface of the carcass, the tire sensor container system including:
   a tire pressure monitoring system sensor, the tire pressure monitoring system sensor including a rigid housing, the housing being formed with an oval shape, a sensor base, and a sensor top;
   a flexible container being mounted to the innerliner, the container including a container base and a wall extending radially outwardly from the container base, wherein the wall terminates in a lip that extends axially inwardly from the wall;
   the wall being formed with an oval shape that cooperates with the shape of the tire pressure monitoring sensor housing;
   a cavity defined by the container base, the wall, and the lip, the cavity receiving and securing the tire pressure monitoring system sensor; and
   wherein the sensor base is disposed proximate the cavity base and the lip captures the sensor top.

2. The tire sensor container system of claim 1, wherein the tire pressure monitoring system sensor includes a protrusion radially extending from the sensor top and away from the housing.

3. The tire sensor container system of claim 2, wherein the protrusion is formed with a rectangular cross section.

4. The tire sensor container system of claim 1, wherein the container is formed of at least one of an elastomer and a polymer.

5. The tire sensor container system of claim 1, wherein the base includes at least one of a circular shape and an oval shape.

6. The tire sensor container system of claim 1, wherein the lip defines an opening, and the tire pressure monitoring system sensor is inserted into the cavity of the container through the opening.

7. The tire sensor container system of claim 1, wherein the tire pressure monitoring system sensor housing includes a pair of electrical contacts mounted on the sensor base.

8. The tire sensor container system of claim 7, wherein the cavity is a first cavity, and the wall and the container base form a second cavity adjacent the first cavity.

9. The tire sensor container system of claim 8, further comprising an additional sensor being disposed in the second cavity.

10. The tire sensor container system of claim 9, wherein the additional sensor includes at least one of a tread wear sensor, a temperature sensor, an accelerometer, and a load sensor.

11. The tire sensor container system of claim 9, wherein the container maintains electrical contact between the tire pressure monitoring system sensor and the additional sensor.

12. The tire sensor container system of claim 9, wherein a protrusion is formed on the housing of the tire pressure monitoring system sensor, the protrusion enabling manual rotation of the tire pressure monitoring sensor in the container to ensure alignment of the electrical contacts with the additional sensor.

13. The tire sensor container system of claim 1, wherein the container base is formed with a bottom surface, the bottom surface contacting and being secured to the innerliner.

14. The tire sensor container system of claim 13, wherein the bottom surface of the base is attached to the innerliner by an adhesive.

15. The tire sensor container system of claim 13, wherein the bottom surface of the base is formed with a double curvature.

* * * * *